NON-LINEAR VIDEO-SIGNAL MODULATING SYSTEMS WITH A CHARACTERISTIC "INSTANTANEOUS FREQUENCY DEVIATION VS. PRE-EMPHASIZED SIGNAL LEVEL" HAVING A DECREASING SLOPE WITH INCREASING ABSOLUTE VALUE OF SIGNAL LEVEL

Filed March 5, 1963

INVENTOR.

GÉRARD MELCHIOR

By Kurt Kelman

AGENT

Nov. 15, 1966 G. MELCHIOR 3,286,024

NON-LINEAR VIDEO-SIGNAL MODULATING SYSTEMS WITH A CHARACTERISTIC "INSTANTANEOUS FREQUENCY DEVIATION VS. PRE-EMPHASIZED SIGNAL LEVEL" HAVING A DECREASING SLOPE WITH INCREASING ABSOLUTE VALUE OF SIGNAL LEVEL

Filed March 5, 1963

2 Sheets-Sheet 2

INVENTOR.

GÉRARD MELCHIOR

BY Kurt Kelman

AGENT

United States Patent Office 3,286,024

Patented Nov. 15, 1966

3,286,024

NON-LINEAR VIDEO-SIGNAL MODULATING SYSTEMS WITH A CHARACTERISTIC "INSTANTANEOUS FREQUENCY DEVIATION VS. PRE-EMPHASIZED SIGNAL LEVEL" HAVING A DECREASING SLOPE WITH INCREASING ABSOLUTE VALUE OF SIGNAL LEVEL

Gérard Melchior, Levallois-Perret, France, assignor to Compagnie Francaise de Television, a corporation of France Filed Mar. 5, 1963, Ser. No. 263,059
Claims priority, application France, Mar. 12, 1962, 890,746
11 Claims. (Cl. 178—5.2)

The present invention relates to video signal transmission systems, and more particularly to television transmission systems wherein video signals modulate a subcarrier.

According to the invention a video signal transmission system comprises:

A transmitter comprising: means for pre-emphasizing said video signals through emphasizing the higher frequencies thereof; and a non-linear system for frequency modulating said pre-emphasized signals on a wave, with a characteristic "instantaneous frequency deviation versus pre-emphasized signal level" presenting a slope which decreases, continuously or discontinuously, with the absolute value of said level increasing.

And a receiver comprising: a non-linear system for deriving said pre-emphasized signals from said frequency modulated wave; and de-emphasizing means, for deriving said video signals from said pre-emphasized signals.

An excellent protection against noise is thus obtained without increasing the distortion for a given transmission channel.

According to a preferred embodiment of the invention, the frequency modulated wave is, in addition to the frequency modulation, amplitude modulated in such a manner as to increase its amplitude, continuously or discontinuously, with the absolute value of the pre-emphasized signal level.

The invention will be best understood from the following description and appended drawings, wherein.

The precise meaning of certain terms which will be used in the present specification will first be set forth.

A frequency modulation wave, the instantaneous frequency F of which varies between $Fo-\Delta F$ and $Fo+\Delta F$ will be considered, the highest frequency of the modulating signal being $f_M$.

The following terms will be used:

Fo: carrier frequency.

ΔF: frequency deviation.

$Fo-\Delta F$ to $Fo+\Delta F$ frequency interval, or bandwidth $2\Delta F$ of this frequency interval: frequency swing.

$F-Fo$: instantaneous frequency deviation.

$\Delta F/f_M$: modulation index.

As is known, the frequency modulation provides an excellent protection against noise at the lower frequencies of the modulating signal, whether the noise is, for example, background noise, or noise due to interfering signals. However, this protection decreases substantially in the inverse ratio of the modulating frequency, so that, for a given subcarrier amplitude and a given transmission channel, the overall protection against noise, starting from a certain bandwidth of the modulating signal, is lower with frequency modulation than with amplitude modulation (the amplitude considered, in the case of amplitude modulation, being the peak amplitude).

In a known colour television system, the carrier wave is modulated by a wide-band luminance signal and by a subcarrier, which is itself alternately modulated, according to a line-sequential pattern, by two auxiliary colour signals.

At the receiver, the two sequential signals are made simultaneous, each one being used twice by means of a delay device which makes it possible to repeat the signals. The signals applied to the trichrome tube are then obtained by the combination of the signals transmitted.

In one embodiment of this system, the carrier is amplitude modulated, while the subcarrier is frequency modulated. The frequency modulation of the subcarrier presents with respect to the amplitude modulation thereof, certain desirable advantages, such as a better transmission stability.

However, the fact that frequency modulation affords less protection against noise at the higher frequencies of the modulating signal results in a great number of moving parasitic structures affecting the whole of the image on the screen of the colour receiver, the quality of the image being thus substantially impaired.

It is known, for example in broadcasting techniques, to pre-emphasize the higher frequencies of the modulating signals at the transmission with a view towards obtaining better protection of the frequencies against noise.

There is thus obtained an improvement of the signal-to-noise ratio, which improvement increases with the degree of pre-emphasis.

Figure 1:
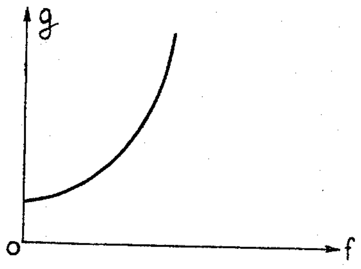
FIG. 1 is a pre-emphasis characteristic curve.

In FIG. 1, there is shown, by way of example, the general aspect of a pre-emphasis characteristic curve indicating the gain $g$ as a function of the spectral frequency components of the signal transmitted.

The applicant has found that the pre-emphasizing techniques, as so far applied, meet with serious difficulties in the transmission of video signals, to the point of rendering such techniques practically unusable in the transmission of a signal by means of a subcarrier wave in colour television broadcasting. The reasons therefore are twofold:

(1) The amplitude of the higher frequency components of the modulating signal spectrum considerably affects that part of the spectrum which is to be practically retained in a frequency modulated wave. Since video signals have a very large bandwidth, this has many consequential effects in the case of pre-emphasized video signals.

(2) The video signals present steep front transitions, which are not practically met with in audio-frequency signals.

As a consequence, a pre-emphasizing results, for example, in doubling or trebling the peak to peak level difference of those steep front signals, when the degree of pre-emphasis is sufficiently high to afford an effective protection against noise.

If, under such conditions, it is desired to provide an efficient pre-emphasis, with a comparatively high modulation index, it is necessary to increase greatly the bandwidth of the transmission channel to obtain signal transmission without undue distortions. This is a major drawback, which is hardly admissible for a colour television subcarrier wave.

On the other hand, the association of an efficient pre-emphasis and a low modulation index is of little interest, since a low modulation index reduces the protection against noise and may, ultimately, more than compensate for the advantages resulting from the pre-emphasis.

The applicant has also found that a different procedure, consisting in effecting, at the transmission, a non linear transformation of the signal, which consists in enhancing the lower levels with respect to the higher levels, the reverse operation taking of course place at the reception, adversely affects the image, when video signals are transmitted by means of a frequency modulated wave.

In this case, calculations would tend to show that better protection against noise is obtained, in the sense that noise, as integrated with respect to time at the reception, decreases, due to the fact that the probability of weak signals is much higher than the probability of strong signals, this rule holding generally true for most signals and, in particular, for television video signals.

However, the latter may present long duration constant levels of any value. It follows that the non linear transformation considered results in the fact that on the receiver screen the substantially uniformly distributed moving parasitic structures mentioned above are generally weakened, but that extensive zones of reinforced packages of moving parasitic structures appear from time to time. Experience shows that this is more disturbing for the observer than the previous state of things, so the cure is in this case worse than the evil.

The applicant has found that it is possible to combine pre-emphasis with a non linear level modification, so as:

(1) to obtain a signal capable of being transmitted, without any substantial reduction in fidelity, in the same bandwidth as the initial signal;

(2) to obtain, at the reception, after restoration of the initial signal, an image the optical quality of which is considerably improved.

According to the invention, the initial signal V, of a level N variable as a function of time, is therefore subjected to a strong pre-emphasis, which converts it into a signal V′ of a level N′.

A non linear level transformation converts signal V′ into a signal V″ of a level N″, the non linear transformation characteristic $N''=f_s(N')$ being selected in such a manner that:

(a) The variation interval of N″ is limited to a suitable value, for example to the variation interval of N. The video signal to be transmitted being normally adjusted so as to vary between two algebraically opposite values —M and M, the linear transformation will then cause V″ to vary between $-M''=-M$ and $M''=M$.

(b) The non linear transformation is such that the lower levels of signal N′ are enhanced as compared to its higher levels. More precisely, the slope of the curve $$N''=f_s(N')$$

as plotted in a system of rectangular axes ON′ and ON″, decreases, continuously or not, when N′ increases in absolute value.

It is quite obvious that this characteristic curve is preferably selected to be symmetrical with respect to point O, as far as this is also the case for the variation interval of the signal to be transmitted.

Signal V″ may be obtained at the reception by linear demodulation of the frequency modulated wave, while signal V′ may be derived from V″ by a nonlinear transformation, which is the reverse of that effected at the reception, i.e., $N'=f_u(N'')$, signal V being finally restored by passage of signal V′ in a de-emphasizing device, as is well known in the art.

Experience shows that this eliminates the homogeneously distributed parasitic structures mentioned above: only quasi "unidimensional" parasitic structures will subsist, i.e., those assuming, for example, the shape of very thin curve portions, which structures are morever comparatively rare. On the whole, in spite of this remaining slight defect, a very substantial improvement in the image quality is noted.

It is to be remarked that the nonlinear transformation $N''=f_s(N')$, followed by a linear modulation of the carrier wave according to the relation:

$$\frac{(F-F_o)}{\Delta F}=\frac{N''}{M''}$$

where M″ represents the maximum positive level of N″, may be interpreted as a nonlinear modulation of the wave as a function of level N′, according to the characteristic:

$$\frac{F-F_o}{\Delta F}=\frac{f_s(N')}{M''}$$

In fact, in the transmission mode according to the invention, provided, of course, that a nonlinear modulator, corresponding to such a relation, is available, a direct modulation of the wave as a function of N′ may take place.

The same is true for the reception. The linear demodulation of the carrier wave leading to the signal $$N''=\frac{M''}{\Delta F}\cdot(F-F_o)$$

followed by the non linear transformation $N'=f_u(N'')$, may be considered as a nonlinear demodulation of the carrier according to the relation:

$$N'=f_u\left(\frac{M''}{\Delta F}F-F_o\right)$$

Again in this case, the same method may be used, provided a corresponding nonlinear frequency discriminator can be made available.

Figure 2:
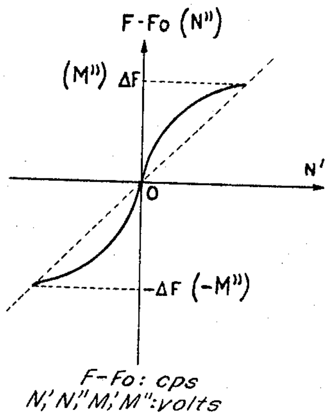
FIG. 2 is an example of the characteristic curve of a non-linear modulation as a function of the level of the pre-emphasized signal, which can be used in a transmission system according to the invention.
Figure 3:
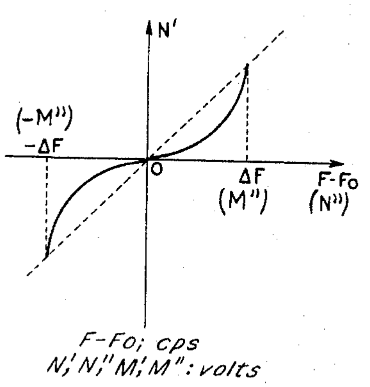
FIG. 3 is a demodulation characteristic curve corresponding to the modulation curve of FIG. 2.

FIGS. 2 and 3, respectively show, by way of example, a non-linear modulation characteristic of the type used according to the invention and the corresponding non-linear demodulation characteristic.

In FIG. 2, levels N′ are plotted along the abscissae and levels N″ along the ordinates. In the example illustrated, the slope varies strongly and continuously between the zero value of N′ and the maximum absolute value of N′. This is an extreme example.

In a highly simplified case, the characteristic may be built up from three straight line portions, the central portion, centered on point O, having a slope higher than that of the two lateral portions.

Other types of characteristics may of course be used, provided the condition relative to the slope is satisfied and the variation range of N″ is suitably limited with respect to the variation range of N′.

All these characteristics being shaped somewhat as an S, may be termed "S-characteristics" and the corresponding modulation as "S-modulation."

In FIG. 2, the ordinate values are expressed not only as a function of $F-F_o$, but also of N′, N′ being proportional to $F-F_o$. Accordingly, the characteristic $$N''=f_s(N')$$

may be represented by the same curve as the non-linear modulation characteristic as a function of N′, provided the coordinate scales used are so selected that the ΔF value should correspond to the M″ value. This may, however, lead, as in the case of the figure, to take two different scales for the level values plotted as abscissae (N′) and as ordinates (N″).

In FIG. 3, the non-linear demodulation characteristic is represented with $F-F_o$ plotted along the absissae and N′ along the ordinates. This characteristic is symmetrical with the corresponding non-linear modulation characteristic with respect to the first bisectrix of the coordinate axes, whatever the shape of this latter characteristic. The $N'/N''$ characteristic showing how N′ is again derived from N″ may be represented by the same curve as the non-linear demodulation characteristic providing N′ as a function of $F-F_o$, under the same conditions as above. Therefore, values $F-F_o$ and N″ are both plotted along the abscissae.

Given the above indications, it is possible to point out the advantages provided by the invention, as to the bandwidth. To this effect, practical data which also lead to excellent results in improving the image quality, will be given:

Initial signal V: bandwidth 700 kc./s., level variation range $M=-1$ to $M=+1$;
Subcarrier: $F_o=4.3$ mc./s.;
Frequency deviation: $\Delta F=850$ kc./s.

The pre-emphasis was effected according to the law $$N'=N+10^{-6}.\frac{dN}{dt}, \text{ i.e., } g=1+\left(\frac{\pi f}{500}\right)^2$$

where $g$ is the power gain, $f$ being expressed in kc./s.

The deformation or level modification characteristic was formed, as previously mentioned, of three straight line segments, the segment centered on O and comprised between $N'=-\frac{1}{2}$ and $N'=+\frac{1}{2}$ having a slope equal to 1 and the two lateral segments having a slope equal to ½, the variation range of level N″ being thus restricted to the range $-M''=-1$ to $M''=1$.

The remarkable fact may then be noted that the transmission of N″ by a wave linearily modulated in frequency as a function of N″, may be effected without substantially increasing the distortions, with the subcarrier channel having the same bandwidth as that necessary for the transmission of V, this being so in spite of the pre-emphasis of higher frequencies and of the harmonics due to the non-linear transformation.

This fact might be explained as follows:

In linear frequency modulation, the required bandwidth is considered to extend from $F_o-\Delta F-nf_M$ to $F_o+\Delta F+nf_M$, where $f_M$ is the highest frequency of the modulating signal, and $n$ an integer which is the greater as the fidelity required is higher and the modulation index greater.

This expression may be interpreted as follows: it is necessary to have a range equal to $\pm nf_M$ on both sides of each instantaneous frequency transmitted.

Considering, however, that during an interval of time $\Delta t$, the mean level $N'i$ of signal V′ is fixed by the lower frequency components of V′ and that its differential variations from this level during the interval of time $\Delta t$ are determined by the higher frequency components, it follows that the modulation index to be considered in evaluating the coefficient $n$ during time interval $\Delta t$, in the case of a non-linear modulation, is the "differential" modulation index, i.e., the slope of the modulation characteristic at point $N'i$.

However, with an S-shape characteristic, one does not have simultaneously a high value of $N'i$, i.e., a great value of $F-F_o$, and a high slope of the non-linear modulation characteristic at this point.

In other words, coefficient $n$ may be taken lower for the end portions of the frequency swing and the necessary band is thus substantially reduced.

It is, of course, obvious that the example given hereinabove is in no manner limitative.

Another valuable variation of the S-characteristic is $N''=a$ arc tg $bN'$, where $a$ and $b$ are constant coefficients.

Some arrangements which may be used according to the invention will now be described.

Figure 4:
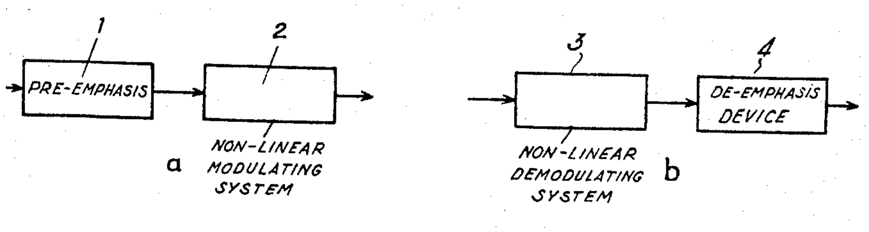
FIG. 4 is a simplified block diagram of a transmitting and receiving system according to the invention.

FIG. 4 is a simplified diagram of the principle of a transmission-reception arrangement according to the invention.

FIG. 4-$a$ shows a pre-emphasizing system 1 of a known type, comprising a filter followed by an amplifier, for achieving a pre-emphasis according to a curve of the type illustrated in FIG. 1. System 2 provides a frequency modulation in S.

FIG. 4-$b$ shows the corresponding receiver circuits, including a non-linear demodulating system 3 with a demodulation curve which is the reverse of that of system 2, and a de-emphasizing system 4, of a known type, comprising a filter and an amplifier, adapted to effect a transformation of the signal which is the reverse of that effected by filter 1.

According to a preferred embodiment of the invention, the input signal of the pre-emphasizer 1 are colour signals which are to be transmitted by modulating a subcarrier. The output signal V′ of pre-emphasizer 1 is applied to the modulating system 2, whose output signal is mixed with the luminance video signal and the carrier is modulated by the resulting complex signal. At the reception, the sub-carrier is separated by filtering according to the known art and is applied to the demodulating system 3. The demodulated signal V′ is applied to the re-emphasizer 4, the output of which restitutes the initial colour signals.

Figure 5:
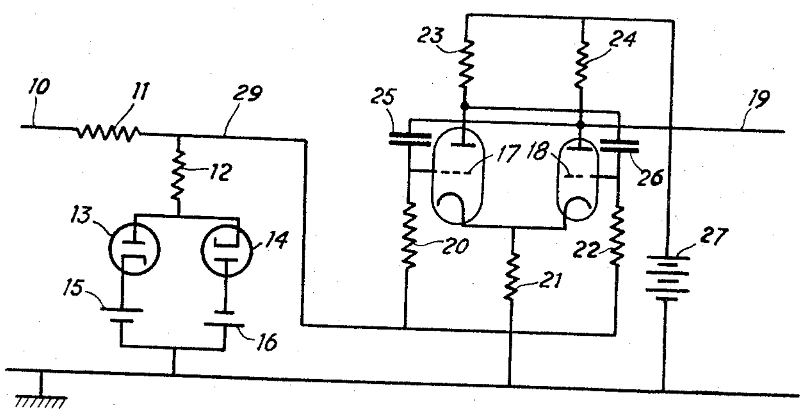
FIGS. 5 and 6 illustrate details of a part of the circuits shown in FIG. 4.

FIG. 5 shows the diagram of an embodiment of the non-linear modulating system 2 of FIG. 4. In this embodiment a linear frequency modulator is used and is preceded by a level modifying circuit which transforms each level N′ of the pre-emphasized signal V′ into a level N″.

In this embodiment, it has been assumed that the modulation characteristic is of the simplified type described above, i.e., including three straight line portions.

In FIG. 5, an output 10, corresponding to the input of system 2 shown in FIG. 4, is grounded through two resistances 11 and 12, having values $R_1$ and $R_2$, and a circuit in parallel, having two branches, respectively comprising a diode 13 conducting towards ground in series with a voltage source 15, the negative terminal of which is grounded, and a diode 14 which conducts from ground in series with a D.C. voltage source 16, the positive pole of which is grounded. The voltages delivered by sources 15 and 16 have respective values $+V_o$ and $-V_o$. This circuit is of a known type. Junction point 29, common to resistances 11 and 12, is connected, respectively through resistances 20 and 22, to the grids of two triodes 17 and 18 of a relaxation oscillator.

If N′ is higher than a positive value $N'_o$, diode 13 is conductive and resistances 11 and 12 act as a potentiometer for the portion of N′ exceeding $N'_o$.

The operation is similar for $N'<-N'_o$, diode 14 being then conductive. For N′ comprised between $-N'_o+N'_o$, the two diodes are blocked and no current flows through resistances 12. A signal N″ is then received on the grids of the triodes, corresponding to the non linear level deformation of the type indicated. The two triodes 17 and 18 are coupled through a common cathode resistance 21, their plates being connected, through resistances 23 and 24, to a positive voltage source 27.

The grid of triode 17 is connected to the plate of triode 18 through a capacitor 25 and the grid of triode 18 is connected to the plate of triode 17, through a capacitor 26. The output is connected to one of the plates, say that of triode 18. This known modulator provides an oscillation, the frequency of which is a substantially linear function of the algebraic value of the voltage applied in parallel to the two grids.

Figure 6:
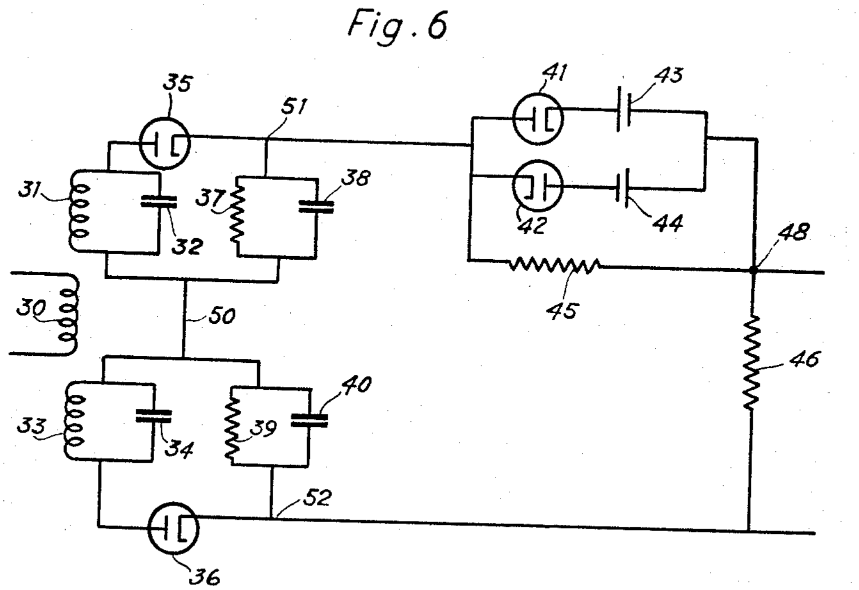

FIG. 6 illustrates the demodulation circuit 3 of FIG. 4, which is adapted to cooperate with the modulation device shown in FIG. 5.

It consists of a linear discriminator and a signal restoring system which modifies the discriminator output signal in a manner which is the reverse of that effected in the system of FIG. 5, before the modulator input.

The frequency discriminator consists of two resonant circuits, one including an inductance coil 31 connected in parallel with a capacitor 32, and the other an inductance coil 33 in parallel with a capacitor 34. The former circuit is tuned to a frequency $F_1=F_o+\Delta F+B_1$ and the latter to a frequency $F_2=F_o-\Delta F-B_2$, where $B_1$ and $B_2$ have positive values. The two resonant circuits are connected to a common terminal 50, and have their other terminals respectively connected to the anodes of diodes 35 and 36, the cathodes of which are connected to terminals 51 and 52.

Between terminals 51 and 50, is inserted a circuit including in parallel a resistance 37 and a capacitor 38, and between terminals 52 and 50 a circuit including a resistance 39 and capacitor 40.

The resonant circuits 31–32 and 33–34 are inductively coupled to a winding 30 across which the input signal is applied.

The output voltages of the resonant circuits are rectified through circuit arrangements 35–37–38 and 36–39–40, respectively.

By suitably selecting the values of the elements of these circuits as is well known in the art, an E.M.F. is obtained between the terminals 51 and 52, which is proportional to the instantaneous frequency deviation of the input signal and consequently to N″.

The signal restoring circuit inserted between terminals 51 and 52 comprises a circuit including three branches in parallel between terminals 51 and 48. A resistance 46, having a value $R_4$, is inserted between terminals 48 and 52. The first branch includes a diode 41, the anode of which is connected to terminal 51, and a voltage source 43, the negative pole of which is connected to terminal 48. The second branch comprises a diode 42, the cathode of which is connected to terminal 51 and a voltage source 44 having its positive pole connected to terminal 48. The third branch is formed by a resistance 45, having a value $R_3$. The voltages delivered by sources 43 and 44 have an absolute value $v$.

The output voltage is collected across resistance 46.

The parameters of the circuit may be selected such that the output is proportional to N′. When $$-N''_0 < N'' < +N''_0$$

(where $-N''_0$ and $N''_0$ respectively correspond to values $-N'_0$ and $N'_0$ of $N'_0$) resistances 45 and 46 build up a potentiometer. When N″ exceeds $N''_0$, diode 41 is unblocked and resistance 45 does not dissipate any energy for that fraction of the E.M.F. appearing between terminals 51 and 52, which corresponds to the fraction $N''-N''_0$, of N″.

The operation is similar to $N''<-N'_0$ the diode 42 being then unblocked.

The signal deformation and restoration circuits may be made more complex for obtaining a more continuous variation of the modulation and demodulation slopes.

It is possible to obtain a deformation curve consisting of $(2p+1)$ straight line portions, $p$ being an integer, i.e., comprising one central line portion terminated at both ends by line portions following each other and having decreasing slopes. Such a curve can be obtained by substituting for diodes 13 and 14 an assembly of diodes connected in parallel in the same direction, the diodes of the first group being biased by positive voltage sources $V_1, V_2 \ldots V_p$, and the diode of the second group, which are to be connected in the opposite direction, being biased by the negative voltage source $-V_1, V_2 \ldots V_p$.

The discontinuity of the slope can be avoided by using diodes which do not pass abruptly from their conductive to their non conductive state.

According to a further alternative embodiment of the invention, more particularly usable for obtaining characteristics having no sharp angles, no restoring circuits are used in the receiver but a simple, non linear demodulator, the characteristic of which is, for example, of the type of that shown in FIG. 3, and, more generally of a type having an increasing slope on both sides of the 0-point corresponding to a zero frequency-deviation. In this case, the circuits which follow terminals 51 and 52 in FIG. 6 no longer exist and the output signal is collected between terminals 51 and 52, the general structure of the frequency discriminator being of the same type, but the values of the various elements being selected to obtain a demodulation curve with a constantly increasing slope, which as, a matter of fact, is more readily obtained than a linear curve.

In this case, the best course is to start from a demodulator providing a characteristic of the aforesaid type, and to adapt thereto the non linear modulation characteristic as a function of N′, by means, for example, of a level transformation circuit, including diodes, preceding a linear modulator.

This solution has the advantage to reduce the cost price of the receivers, the necessary precision being obtained by means of the deformation circuits of the transmitter.

It should be noted that the receivers adapted to operate according to the above mentioned colour television system may be designed to include two arrangements connected in parallel for restoring the sequential signals. For instance one arrangement may be for the sequential signals of a given kind and the corresponding repeated signals, and the other for another kind of sequential signals and the corresponding repeated signals.

In this case, each one of these devices comprises a non linear demodulating system and a de-emphasizing system.

A further improvement to the transmission mode according to the invention will now be described.

It has been pointed out hereinabove that, with the transmission mode as described, parasitic structures appear on the receiver screen only in the shape of threadlike structures which in addition are rare. Of course, even such parasitic structures should be preferably eliminated.

Experience confirmed by theory shows that such interfering structures are a by-product of the non linear modulation. The following explanation might be offered: at the reception, the noise affecting signal V″ and which is normally lower than N″ is multiplied approximately, when signal N′ is being restored, by the derivative $dN'/dN''$, which is the slope, at the point having the abscissa N″ and the ordinate N′, of the restoring characteristic plotted on equal scales for N′ and N″.

This multiplication takes place either in the non linear restoring circuit or in the non linear discriminator, if this latter device is used. This coefficient increases therefore with the absolute value of N′ and N″.

Experience has shown that the image is further substantially improved by subjecting the frequency modulated subcarrier to an additional amplitude modulation, wherein the modulating signal increases with the absolute value of N′. At the reception, a limiting device eliminates this amplitude modulation.

According to a particularly desirable embodiment, the modulating signal is selected to be at least approximately equal for a level N′ of V′, and consequently a level N″ of V″, to the value $p$ of the derivative $dN'/dN''$, i.e., of the slope of the restoring characteristic at the point of abscissa N″ and ordinate N′, a characteristic which may always be plotted, even if use is made of a non-linear freuency discriminator.

This value $p$ may be considered as a function of N′, $p_1(N')$, or as a function of N″, $p_2(N'')$.

Figure 7:
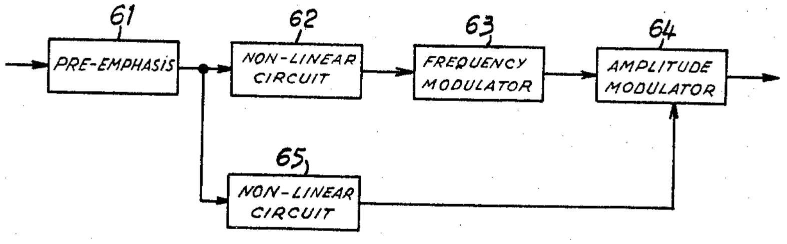
FIG. 7 is a preferred embodiment of a transmission circuit according to the invention.

FIG. 7 represents the corresponding transmission circuit.

In this figure, the initial signal V is applied to the input of a pre-emphasizing system 61, providing V′. This latter signal is applied to the input of a non linear circuit 62 providing V″. Circuit 62 is followed by a linear frequency modulator 63, providing the frequency modulated wave, with a constant amplitude Z, the modulator comprising a limiter at the output. The signal V′, provided by the pre-emphasizing device 61 is also applied to a non linear circuit 65, delivering a signal of a level proportion to $p_1(N')$, for the level N′ applied to its input.

Circuit 64 feeds the modulation input of an amplitude modulator 64, to which is also applied the frequency modulated wave provided by the frequency modulator 63. At the output of the amplitude modulator 64 a signal is collected which is frequency modulated as indicated previously and the amplitude of which is $Z(1+Kp)$ wherein K is a constant.

Signal V' has been used here to form signal $p_1(N')$.

It would obviously amount to the same to collect the signal V'' at the output of the non linear circuit 62 and to transform it to obtain signal $p=p_2(N'')$, the transformation law, and consequently the non-linear circuit used, being different from the first case. Any one of these two methods of operation may be used, according to whether one or the other proves to be more convenient for producing the deformation circuit delivering $p$.

It may be noted that $p$ is proportional to the slope of the nonlinear demodulation characteristic.

The design of the non linear transformation circuit 64 is not critical. It is highly simple in the case of an S shaped characteristic, comprising three straight line portions, since, in this case, the slope takes on only two values, one for the central segment, i.e., for the center values of N', and the other for the two lateral segments, i.e., for the other values of N'. Circuit 64 may then consist of a simple voltage switching device, operated by N' and delivering the one or the other of the two values according to whether the absolute value of N' exceeds or not a threshold value.

In the case of a deformation curve of the type $$N'=a\ arc\ tgbN'$$

where $a$ and $b$ are two constants, N' is proportional to tan $(N''/a)$ and function $p_1(N')$ has thus a simple expression $(1/ab)(1+b^2N'^2)$.

Of course, the simplicity of the mathematical expression is only of secondary importance, since it is not necessary that the non linear modulation law adopted should itself have a simple mathematical expression.

Curves $p_1(N')$ or $p_2(N'')$ may always be graphically obtained and the corresponding non linear circuit approximately provided.

The modification described of the transmission mode requires no corresponding modification in the receiver, since the frequency demodulator normally comprises a limiter which precedes the discriminator, the amplitude modulation being thus automatically eliminated.

Experience has shown, in particular, that the pass-band required for the receiver circuits preceding the limiter need not be widened on account of the auxiliary amplitude modulation. On the contrary, under certain conditions, their pass-band may be reduced without inconvenience, the attenuation thus brought about for the higher instantaneous frequency deviations being compensated by the amplitude modulation; this pass-band reduction presents an additional advantage as concerns the protection against noise and the economy.

The invention is, of course, not limited to the transmission of video signals by means of a subcarrier in a colour television system. The parasitic structures observed on the colour television receiver screen are merely the manifestation, in this precise case, of the noise, which is of the same nature whatever the video signals transmitted.

The invention thus provides an effective defense against noise when video signals are transmitted by a frequency modulated carrier or subcarrier.

What is claimed, is:

1. A system for transmitting video signals, said system comprising:

a transmitter comprising: means for pre-emphasizing said video signals through emphasizing the higher frequencies thereof; a non-linear system, coupled to said pre-emphasizing means for frequency modulating the pre-emphasized signals on a wave, with a characteristic "instantaneous frequency deviation versus pre-emphasized signal level" presenting a slope decreasing with the absolute value of said level increasing, said non-linear system having an output; and means, coupled to said output, for transmitting the frequency modulated wave delivered on said output;

and a receiver comprising means for receiving said frequency-modulated wave: a non-linear system, coupled to said receiving means, for deriving said pre-emphasized signals from said frequency modulated wave; and de-emphasizing means, coupled to said last mentioned non-linear system, for deriving said video signals from said pre-emphasized signals.

2. A system for transmitting a video signal, said system comprising:

a transmitter comprising: means for pre-emphasizing said video signal through emphasizing the higher frequencies thereof; a non-linear system, coupled to said pre-emphasizing means, for frequency modulating the pre-emphasized signal on a wave, with a characteristic "instantaneous frequency versus pre-emphasized signal level" presenting a slope decreasing with the absolute value of said level increasing said non-linear system having an output; a non-linear system, coupled to said output, for amplitude modulating the frequency modulated wave delivered on said output in such a manner that its amplitude increases with the absolute value of said pre-emphasized signal level, said last mentioned non-linear system having an output; and means, coupled to said last mentioned output, for transmitting the frequency and amplitude modulated wave delivered on said last mentioned output;

and a receiver comprising means for receiving said frequency and amplitude modulated wave: a non-linear frequency demodulating system, coupled to said receiving means for deriving said pre-emphasized signals from said amplitude and frequency modulated wave; and de-emphasizing means, coupled to said frequency demodulating non linear system, for deriving said video signals from said pre-emphasized signals.

3. A transmitter for transmitting video signals comprising: means for pre-emphasizing said video signals through emphasizing the higher frequencies thereof; a non-linear transformation network, coupled to said pre-emphasizing means, for modifying the levels of pre-emphasized signals with a characteristic "output level versus input level" presenting a slope which decreases as a function of the absolute value of said input level thus providing transformed signals; a linear frequency modulator, coupled to said transformation network, for modulating said transformed signals on a wave, said frequency modulator having an output; and means, coupled to said output, for transmitting the modulated wave delivered on said output.

4. A transmitter for transmitting video signals comprising: means for pre-emphasizing said video signals; a non-linear frequency modulator, coupled to said pre-emphasizing means for modulating said video signals on a wave, with a modulation characteristic whose slope decreases as a function of the absolute level of said pre-emphasized signals, said modulator having an output; and means, coupled to said output, for transmitting the modulated wave delivered on said output.

5. A transmitter for transmitting video signals comprising: means for pre-emphasizing said video signals; a non-linear transformation network, coupled to said pre-emphasizing means, for modifying the levels of the pre-emphasized signals with a characteristic "output level versus input level" presenting a slope which decreases as a function of the absolute value of said input level to provide transformed signals; a linear frequency modulator, coupled to said network, for modulating said transformed signals on a wave to provide a frequency modulated wave; a non-linear system, coupled to said modulator, for amplitude modulating said frequency modulated wave in such a manner that its amplitude increases with the absolute level of said pre-emphasized signals, said nonlinear system having an output; and means for transmitting the output wave of said non-linear system.

6. A transmitter as claimed in claim 5, wherein said non-linear amplitude modulating system comprises a second non-linear transformation network fed by said first non-linear transformation network, and a linear amplitude modulator coupled to said frequency modulator and to said second non-linear transformation network.

7. A transmitter as claimed in claim 5, wherein said non-linear amplitude modulating system comprises a second non-linear transformation network fed by said pre-emphasizing means, and a linear amplitude modulator coupled to said frequency modulator and to said second non-linear transformation network.

8. A transmitter for transmitting video signals comprising: means for pre-emphasizing said video signals to provide pre-emphasized signals; a non-linear frequency modulator, coupled to said pre-emphasizing means, for modulating said pre-emphasized video signals on a wave, to provide a frequency modulated wave with a modulation characteristic whose slope decreases as a function of the absolute value of the level of said pre-emphasized signals; a non-linear system for amplitude modulating said frequency modulated wave in such a manner that its amplitude increases with the absolute level of said pre-emphasized signals, said non-linear system having an output; and means for transmitting the output wave of said non-linear system.

9. A receiver comprising: means for receiving a wave which is non-linearly frequency modulated as a function of the level of pre-emphasized signals corresponding to video signals, with a characteristic "instantaneous frequency deviation versus pre-emphasized signals level" whose slope decreases as a function of the absolute value of said level; a linear frequency demodulator, coupled to said receiving means, said demodulator having an output; a non-linear transformation network, coupled to said output and modifying the levels of the output signals of said linear frequency demodulator, for restoring said pre-emphasized signals; and de-emphasizing means coupled to said non-linear transformation network for restoring said video-signals.

10. A receiver comprising: means for receiving a wave which is non-linearly frequency modulated as a function of the level of pre-emphasized signals corresponding to video signals, with a characteristic "instantaneous frequency duration versus pre-emphasized signals level," whose slope decreases as a function of the absolute value of said level; a non-linear frequency demodulator, coupled to said receiving means, for deriving said pre-emphasized signals from said wave; and de-emphasizing means coupled to said non-linear transformation network for restoring said video-signals.

11. A receiver as claimed in claim 10, wherein said receiver is a colour television receiver, and said frequency modulated wave is a sub-carrier.

References Cited by the Examiner

UNITED STATES PATENTS

| | | | |
|---|---|---|---|
| 2,410,489 | 11/1946 | Fitch | 325—46 |
| 2,841,638 | 7/1958 | Rieke | 325—46 X |
| 2,923,887 | 2/1960 | Aiken | 332—17 X |
| 3,117,278 | 1/1964 | Johnson | 325—65 |

DAVID G. REDINBAUGH, *Primary Examiner.*

J. H. SCOTT, *Assistant Examiner.*